(12) United States Patent
Singh et al.

(10) Patent No.: US 9,902,327 B1
(45) Date of Patent: Feb. 27, 2018

(54) SELECTIVELY DEPLOYABLE STEP MEMBER FOR A MOTOR VEHICLE

(71) Applicant: GM GLOBAL TECHNOLOGY OPERATIONS LLC, Detroit, MI (US)

(72) Inventors: Parminder Singh, Rochester Hills, MI (US); Alex J. Smith, Madison Heights, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 15/440,540

(22) Filed: Feb. 23, 2017

(51) Int. Cl.
*B60R 3/02* (2006.01)
*B60R 3/00* (2006.01)

(52) U.S. Cl.
CPC .............. *B60R 3/02* (2013.01); *B60R 3/002* (2013.01)

(58) Field of Classification Search
CPC .................................. B60R 3/002; B60R 3/02
See application file for complete search history.

(56) References Cited

U.S. PATENT DOCUMENTS

| 7,086,656 | B2 * | 8/2006 | Kolpasky | B60R 3/002 |
| | | | | 280/164.1 |
| 7,367,574 | B2 * | 5/2008 | Leitner | B60R 3/02 |
| | | | | 280/163 |
| 7,673,902 | B2 * | 3/2010 | Jayasuriya | B60R 3/002 |
| | | | | 280/755 |
| 9,073,486 | B1 * | 7/2015 | Meszaros | B60R 3/02 |

* cited by examiner

*Primary Examiner* — John Walters
*Assistant Examiner* — James Triggs
(74) *Attorney, Agent, or Firm* — Cantor Colburn LLP

(57) ABSTRACT

A running board for a vehicle includes a base member mountable to a vehicle. The base member has a first end, a second end, and an intermediate portion extending therebetween defining a longitudinal axis. A selectively deployable step member is mounted to the base member. The selectively deployable step member is selectively slidable relative to the base member along the longitudinal axis.

17 Claims, 4 Drawing Sheets

SELECTIVELY DEPLOYABLE STEP MEMBER FOR A MOTOR VEHICLE

INTRODUCTION

Exemplary embodiments relate to the art of motor vehicles and, more particularly, to a motor vehicle having an adjustable running board.

Various vehicles including pickup trucks, sport utility vehicles (SUV's) and the like are provided with running boards. The running boards may serve as an aid to a driver or passenger when entering into or alighting from a vehicle. Running boards may be static, (e.g. fixedly mounted to the vehicle) or selectively deployable. Selectively deployable running boards include those that transition between a stowed and deployed configuration laterally outwardly. Other selectively deployable running boards may transition between the stored and deployed configuration laterally outwardly and rearwardly. Still other selectively deployable running boards may unfold downwardly and outwardly from the vehicle. Outward deployment together with rearward deployment provides a step that a user may utilize to access, for example, a pickup truck bed.

Many pickup trucks and SUV's are designed with, or later modified to, have a high ground clearance. Accordingly, various portions of the vehicle may be difficult to access. Roof racks and engine compartments may be difficult to access for a number of individuals. Accordingly, it is desirable to provide a running board with an adjustable surface that provides more flexibility for individuals to access various portions of a vehicle.

SUMMARY

In accordance with an aspect of an exemplary embodiment, a running board for a vehicle includes a base member mountable to a vehicle. The base member has a first end, a second end, and an intermediate portion extending therebetween defining a longitudinal axis. A selectively deployable step member is mounted to the base member. The selectively deployable step member is selectively slidable relative to the base member along the longitudinal axis.

In addition to one or more of the features described above or below, or as an alternative, further embodiments could include an electric motor arranged in the base member, the electric motor being selectively activated to shift the selectively deployable step member along the longitudinal axis.

In addition to one or more of the features described above or below, or as an alternative, further embodiments could include a switch element arranged at the second end, the switch element being operable to selectively activate the electric motor.

In addition to one or more of the features described above or below, or as an alternative, further embodiments could include a latch system actuatable to selectively unlock the selectively deployable step member relative to the base member.

In addition to one or more of the features described above or below, or as an alternative, further embodiments could include wherein the latch system comprises an electrically operated lock.

In accordance with another aspect of an exemplary embodiment, a vehicle includes a frame, a body supported by the frame, and a running board coupled to the frame. The running board includes a base member mountable to the frame. The base member has a first end, a second end, and an intermediate portion extending therebetween defining a longitudinal axis. A selectively deployable step member is mounted to the base member, the selectively deployable step member being selectively slidable relative to the base member along the longitudinal axis.

In addition to one or more of the features described above or below, or as an alternative, further embodiments could include an electric motor arranged in the base member, the electric motor being selectively activated to shift the selectively deployable step member along the longitudinal axis.

In addition to one or more of the features described above or below, or as an alternative, further embodiments could include a switch element arranged at the second end, the switch element being operable to selectively activate the electric motor.

In addition to one or more of the features described above or below, or as an alternative, further embodiments could include a latch system actuatable to selectively unlock the selectively deployable step member relative to the base member.

In addition to one or more of the features described above or below, or as an alternative, further embodiments could include wherein the base member is selectively deployable laterally outwardly from the frame.

In addition to one or more of the features described above or below, or as an alternative, further embodiments could include wherein the base member is selectively deployable laterally outwardly and rearwardly.

In accordance with yet another aspect of an exemplary embodiment, a method of deploying a running board having a base member fixedly coupled to a frame of a vehicle and a selectively deployable step member includes sliding the selectively deployable step member relative to the base member along a longitudinal axis.

In addition to one or more of the features described above or below, or as an alternative, further embodiments could include wherein sliding the selectively deployable step member includes activating an electric motor arranged in the base member.

In addition to one or more of the features described above or below, or as an alternative, further embodiments could include wherein sliding the selectively deployable step member includes shifting the selectively deployable step member forwardly.

In addition to one or more of the features described above or below, or as an alternative, further embodiments could include wherein sliding the selectively deployable step member includes shifting the selectively deployable step member rearwardly.

In addition to one or more of the features described above or below, or as an alternative, further embodiments could include locking the selectively deployable step member relative to the base member.

In addition to one or more of the features described above or below, or as an alternative, further embodiments could include wherein locking the selectively deployable step member includes latching the selectively deployable step member to the base member in a deployed configuration and latching the selectively deployable step member to the base member in a stowed configuration.

In addition to one or more of the features described above or below, or as an alternative, further embodiments could include wherein locking the selectively deployable step member includes electrically operating a latch.

In addition to one or more of the features described above or below, or as an alternative, further embodiments could include selectively deploying the base member laterally outwardly of the frame.

In addition to one or more of the features described above or below, or as an alternative, further embodiments could include selectively deploying the base member laterally outwardly and rearwardly relative to the frame.

The above features and advantages and other features and advantages of the exemplary embodiments are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

The following description is merely exemplary in nature and is not intended to limit the present disclosure, its application or uses. It should be understood that throughout the drawings, corresponding reference numbers indicate like or corresponding parts and features. As used herein, the term "module" or "unit" refers to an application specific integrated circuit (ASIC), a field programmable gate array (FPGA), an electronic circuit, an electronic computer processor (shared, dedicated, or group) and memory that executes one or more software or firmware programs, a hardware microcontroller, a combinational logic circuit, and/or other suitable components that provide the described functionality. When implemented in software, a module can be embodied in memory as a non-transitory machine-readable storage medium readable by a processing circuit and storing instructions for execution by the processing circuit for performing a method.

Figure 1:
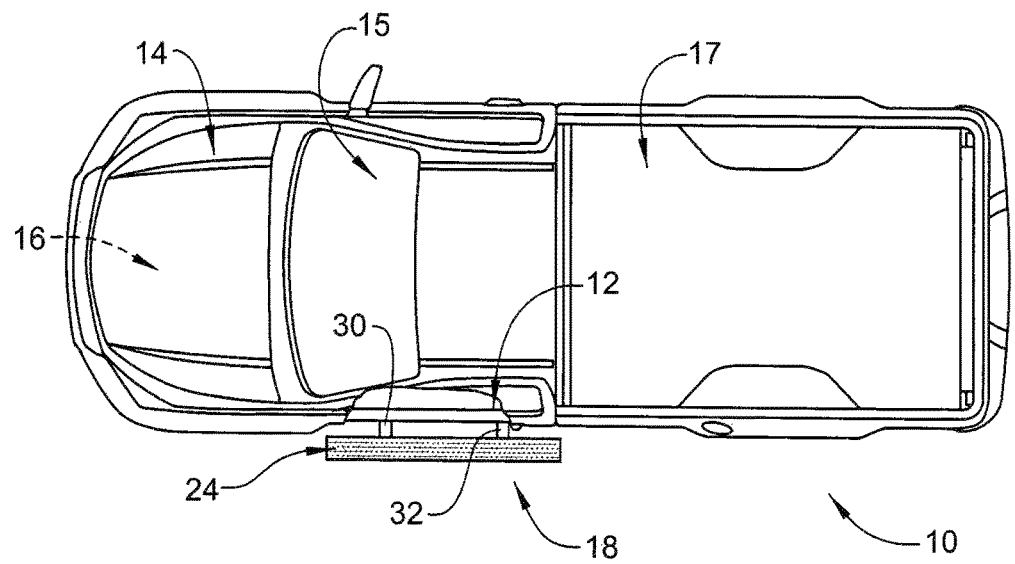
FIG. 1 depicts a vehicle, partially in section, including a selectively deployable step member in a non-deployed configuration, in accordance with an aspect of an exemplary embodiment.
Figure 2:
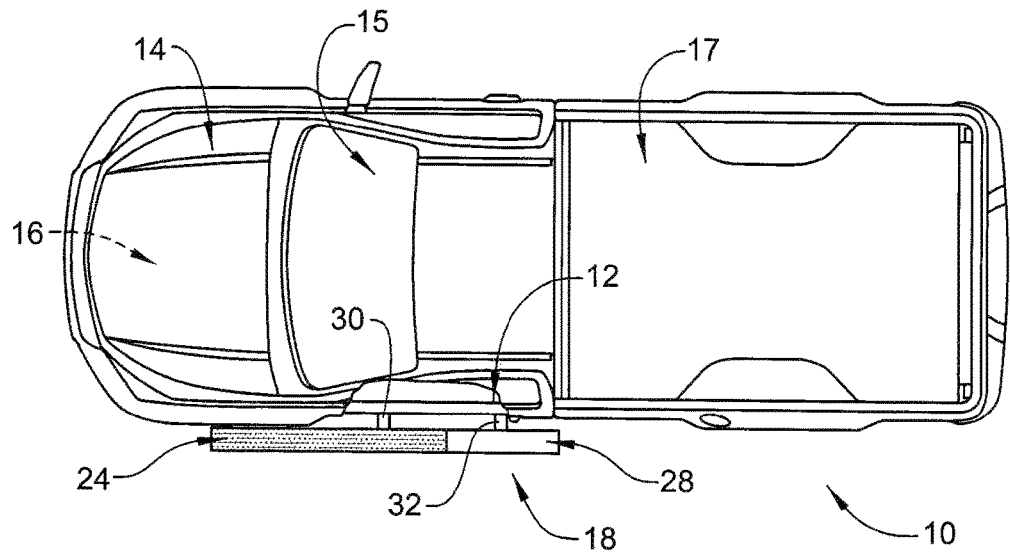
FIG. 2 depicts the vehicle of FIG. 1 illustrating the selectively deployable step member in a forwardly deployed configuration, in accordance with an aspect of an exemplary embodiment.

A vehicle, in accordance with an exemplary embodiment, is indicated generally at 10 in FIGS. 1 and 2. Vehicle 10 includes a frame 12 that supports a body 14 having a passenger compartment 15 and an engine compartment 16. Vehicle 10 is depicted with body 14 defining a pickup truck having a bed 17. It is however to be understood that vehicle 10 may take on a variety of forms including sport utility vehicles (SUV's), passenger vans, commercial vans, or the like. Vehicle 10 includes a running board 18 that may be employed as an aid to passengers getting into and alighting from, passenger compartment 15.

Figure 3:
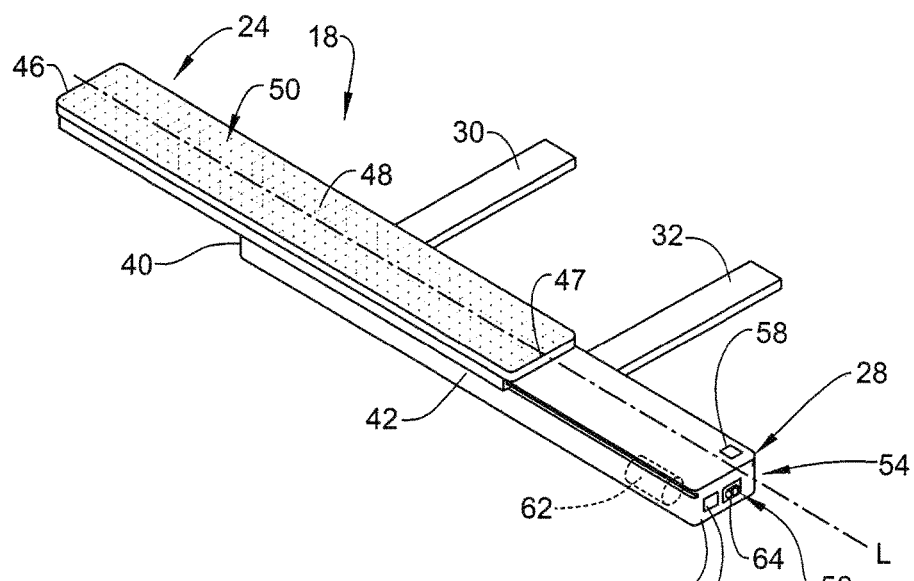
FIG. 3 depicts a perspective view of the selectively deployable step member, in accordance with an aspect of an exemplary embodiment.

In accordance with an aspect of an exemplary embodiment, running board 18 includes a selectively deployable step member 24 slidingly coupled to a base member 28 that is supported from frame 12 through a first support 30 and a second support 32. As illustrated in FIG. 3, base member 28 includes a first end 40, a second end 41, and an intermediate portion 42 extending therebetween. Intermediate portion 42 defines a longitudinal axis "L" of running board 18. Selectively deployable step member 24 includes a first end portion 46, a second end portion 47, and an intermediate section 48 extending therebetween. Intermediate section 48 defines a step surface 50.

Running board 18 may include a latch system 54 including an actuator 56 and a latch element 58. Actuator 56 may be mounted at second end 41 or within passenger compartment 15. Selectively deployable step member 24 may be manually shifted between a stowed configuration, such as shown in FIG. 1, and a deployed configuration, such as shown in FIG. 2. In the deployed configuration, a user may employ selectively deployable step member 24 to access engine compartment 16. Latch element 58 selectively engages selectively deployable step member 24 to prevent undesired movement from the stowed configuration to the deployed configuration.

In accordance with an aspect of an exemplary embodiment, running board 18 may include an electric motor 62 enclosed within base member 28. Electric motor 62 may be selectively activated to automatically shift selectively deployable step member 24 relative to base member 28 along longitudinal axis "L". In accordance with an exemplary aspect, latch system 54 may include an electrically operated lock (not separately labeled) and actuator 56 may define a switch element 64 that activates electric motor 62 and may selectively unlock latch element 58.

Figure 4:
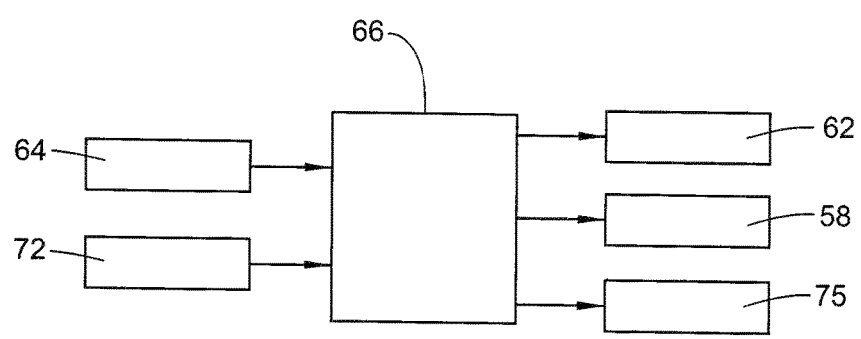
FIG. 4 depicts a block diagram illustrating a running board control module for the selectively deployable step member, in accordance with an aspect of an exemplary embodiment.
Figure 5:
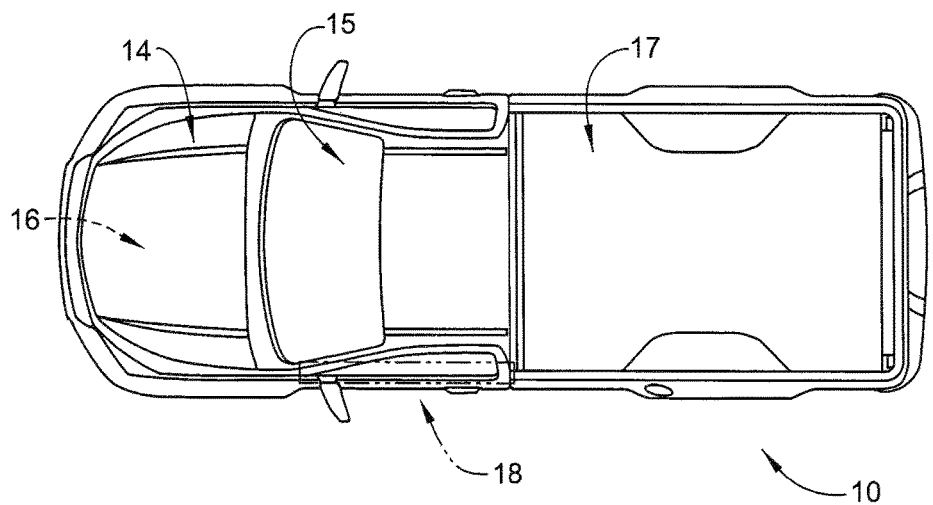
FIG. 5 depicts a vehicle having a selectively deployable running board including a selectively deployable step member, in accordance with another aspect of an exemplary embodiment.
Figure 6:
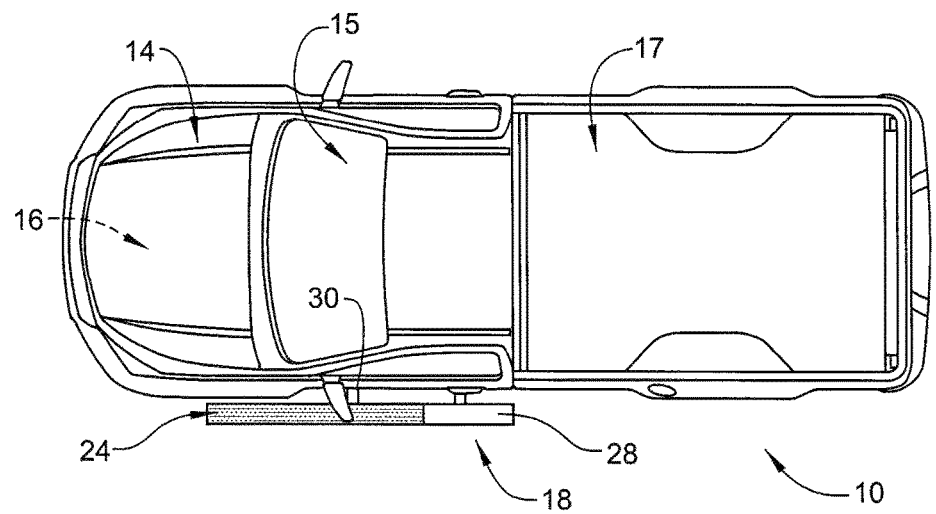
FIG. 6 depicts the vehicle of FIG. 5, illustrating the selectively deployable running board in a deployed configuration, in accordance with an aspect of an exemplary embodiment.

In accordance with an exemplary aspect depicted in FIG. 4, electric motor 62 and switch element 64 may be electrically connected to a running board control module 66. As will be detailed herein, running board control module 66 may control a direction of deployment of selectively deployable step member 24 as well as a deployment of running board 18. In accordance with an exemplary aspect, running board 18 may also include a running board control switch 72 that may be arranged on base member 28 and electrically coupled to running board control module 66. Running board control switch 72 may connect to a running board control system 75 that selectively shifts running board 18 laterally outwardly of vehicle 10 from a stowed configuration (FIG. 5) to a deployed configuration (FIG. 6).

Figure 7:
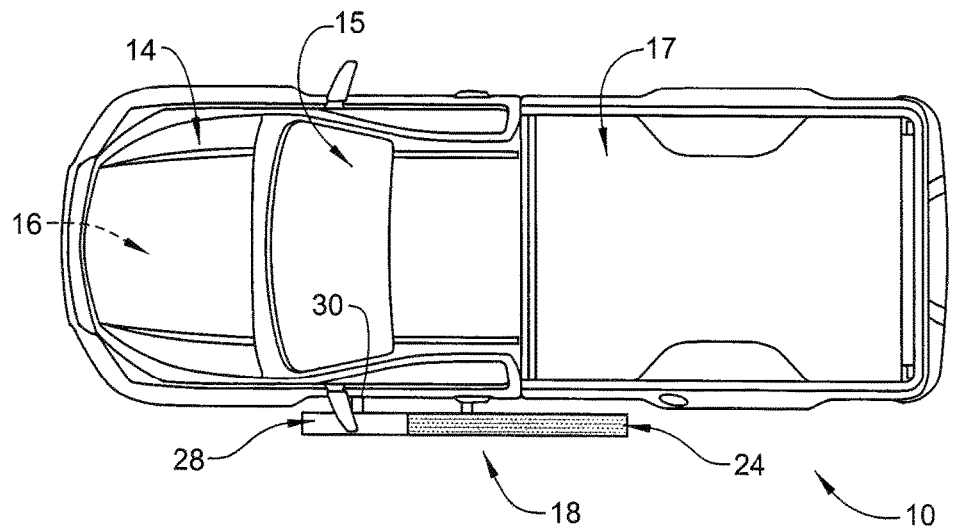
FIG. 7 depicts the vehicle of FIG. 1 with the selectively deployable step member in a rearwardly deployed configuration, in accordance with yet another aspect of an exemplary embodiment.

In accordance with yet another aspect of an exemplary embodiment, selectively deployable step member 24 may be shiftable along longitudinal axis L in a first direction, forwardly, such as shown in FIG. 2, and in a second direction, rearwardly, as shown in FIG. 7. Selectively shiftable step member 24 may be moved manually between the stowed configuration, a first deployed configuration in the first direction, and in a second deployed configuration in the second direction. Alternatively, switch element 64 may comprise a three position switch including an inactive position, a forward deployment position, and a rearward deployment position.

Figure 8:
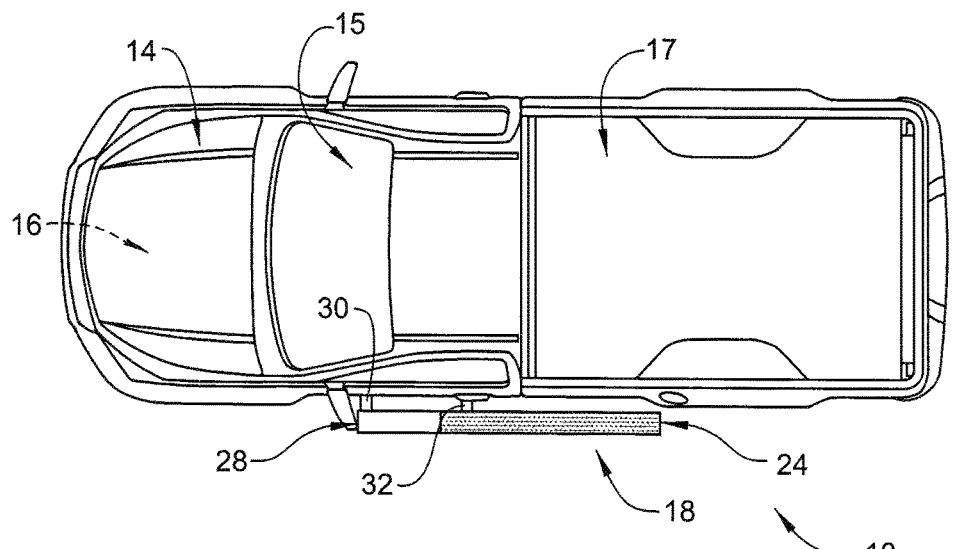
FIG. 8 depicts a vehicle having a selectively deployable running board and selectively deployable step member both in a rearwardly deployed configuration, in accordance with still another aspect of an exemplary embodiment.

In accordance with still yet another aspect, in addition to shifting selectively deployable running board rearwardly, running board 18 may be selectively deployable laterally outwardly and rearwardly as also shown in FIG. 8. In this manner, selectively deployable step member 24 may be employed to access bed 17 or may be shifted along longitudinal axis L to access engine compartment 16.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the invention not be limited to the particular embodiments disclosed, but will include all embodiments falling within the scope of the application.

What is claimed is:

1. A running board for a vehicle comprising:
   a base member mountable to a vehicle, the base member having a first end, a second end, and an intermediate portion extending therebetween defining a longitudinal axis;
   a selectively deployable step member mounted to the base member, the selectively deployable step member being selectively slidable relative to the base member along the longitudinal axis; and
   an electric motor arranged in the base member, the electric motor being selectively activated to shift the selectively deployable step member along the longitudinal axis.

2. The running board according to claim 1, further comprising: a switch element arranged at the second end, the switch element being operable to selectively activate the electric motor.

3. The running board according to claim 1, further comprising: a latch system actuatable to selectively unlock the selectively deployable step member relative to the base member.

4. The running board according to claim 3, wherein the latch system comprises an electrically operated lock.

5. A vehicle comprising:
   a frame;
   a body supported by the frame; and
   a running board coupled to the frame, the running board comprising:
      a base member mountable to the frame, the base member having a first end, a second end, and an intermediate portion extending therebetween defining a longitudinal axis;
      a selectively deployable step member mounted to the base member, the selectively deployable step member being selectively slidable relative to the base member along the longitudinal axis; and
      an electric motor arranged in the base member, the electric motor being selectively activated to shift the selectively deployable step member along the longitudinal axis.

6. The vehicle according to claim 5, further comprising: a switch element arranged at the second end, the switch element being operable to selectively activate the electric motor.

7. The vehicle according to claim 5, further comprising: a latch system actuatable to selectively unlock the selectively deployable step member relative to the base member.

8. The vehicle according to claim 5, wherein the base member is selectively deployable laterally outwardly from the frame.

9. The vehicle according to claim 8, wherein the base member is selectively deployable laterally outwardly and rearwardly.

10. A method of deploying a running board having a base member fixedly coupled to a frame of a vehicle and a selectively deployable step member, the method comprising:
    activating an electric motor arranged in the base member to shift the selectively deployable step member relative to the base member along a longitudinal axis.

11. The method of claim 10, wherein sliding the selectively deployable step member includes shifting the selectively deployable step member forwardly.

12. The method of claim 11, wherein sliding the selectively deployable step member includes shifting the selectively deployable step member rearwardly.

13. The method of claim 10, further comprising: locking the selectively deployable step member relative to the base member.

14. The method of claim 13, wherein locking the selectively deployable step member includes latching the selectively deployable step member to the base member in a deployed configuration and latching the selectively deployable step member to the base member in a stowed configuration.

15. The method of claim 13, wherein locking the selectively deployable step member includes electrically operating a latch.

16. The method of claim 10, further comprising: selectively deploying the base member laterally outwardly of the frame.

17. The method of claim 10, further comprising: selectively deploying the base member laterally outwardly and rearwardly relative to the frame.

* * * * *